US009584597B2

United States Patent
James et al.

(10) Patent No.: US 9,584,597 B2
(45) Date of Patent: Feb. 28, 2017

(54) HARDWARE LEVEL GENERATED INTERRUPTS INDICATING LOAD BALANCING STATUS FOR A NODE IN A VIRTUALIZED COMPUTING ENVIRONMENT

(71) Applicant: INTERNATIONAL BUSINESS MACHINES CORPORATION, Armonk, NY (US)

(72) Inventors: Norman K. James, Liberty Hill, TX (US); Benjamin C. Nowak, Austin, TX (US); Mark W. Vanderwiele, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/073,760

(22) Filed: Mar. 18, 2016

(65) Prior Publication Data

US 2016/0205181 A1    Jul. 14, 2016

Related U.S. Application Data

(63) Continuation of application No. 13/866,716, filed on Apr. 19, 2013, now Pat. No. 9,294,557.

(51) Int. Cl.
*G06F 15/173* (2006.01)
*H04L 29/08* (2006.01)
(Continued)

(52) U.S. Cl.
CPC ........ *H04L 67/1025* (2013.01); *G06F 9/5088* (2013.01); *H04L 41/20* (2013.01);
(Continued)

(58) Field of Classification Search
None
See application file for complete search history.

(56) References Cited

U.S. PATENT DOCUMENTS 7,197,547 B1    3/2007 Miller et al.
8,250,135 B2    8/2012 Driesen et al.
(Continued)

OTHER PUBLICATIONS

Smith, James W. et al. "CloudMonitor: Profiling Power Usage", School of Computer Science, University of St Andrews, Jun. 24, 2012, 2 pages.
(Continued)

*Primary Examiner* — Thomas Dailey
(74) *Attorney, Agent, or Firm* — Steven L. Bennett; Amy J. Pattillo

(57) ABSTRACT

A computing node includes at least one hardware layer comprising a plurality of hardware resources and at least one virtualization layer operative to manage at one virtual machine defined by at least one resource from among the plurality of hardware resources. The computing node includes load balancing interrupt logic configured in the hardware layer of the node. The load balancing interrupt logic is operative to compare at least one resource utilization level of the plurality of hardware resources by the at least one virtual machine with at least one threshold. The load balancing interrupt logic is operative to generate at least one load balancing interrupt indicating at least one load balancing status of the computing node based on the comparison of the at least one resource utilization level with the at least one threshold.

12 Claims, 10 Drawing Sheets

(51) Int. Cl.
*H04L 12/24* (2006.01)
*H04L 12/26* (2006.01)
*G06F 9/50* (2006.01)

(52) U.S. Cl.
CPC ...... *H04L 43/0876* (2013.01); *H04L 67/1004* (2013.01); *G06F 2209/503* (2013.01)

(56) References Cited

U.S. PATENT DOCUMENTS

| | | |
|---|---|---|
| 8,296,434 B1 | 10/2012 | Miller et al. |
| 8,312,195 B2 | 11/2012 | Van Riel |
| 8,341,624 B1 | 12/2012 | Hobbs |
| 8,370,838 B1 | 2/2013 | Omelyanchuk et al. |
| 2002/0091417 A1 | 7/2002 | Splett et al. |
| 2005/0246453 A1 | 11/2005 | Erlingsson et al. |
| 2006/0069761 A1 | 3/2006 | Singh et al. |
| 2009/0228589 A1 | 9/2009 | Korupolu |
| 2011/0145458 A1 | 6/2011 | Narasimhan |
| 2012/0233313 A1 | 9/2012 | Fukami et al. |
| 2012/0266252 A1 | 10/2012 | Spiers et al. |
| 2012/0297059 A1 | 11/2012 | Bross |
| 2013/0055261 A1 | 2/2013 | Han et al. |
| 2013/0055277 A1 | 2/2013 | Ashish et al. |
| 2013/0111467 A1 | 5/2013 | Sundararaj |
| 2014/0317265 A1 | 10/2014 | James et al. |

OTHER PUBLICATIONS

Cui, Zheng et al. "Optimizing Overlay-based Virtual Networking Through Optimistic Interrupts and Cut-through Forwarding," Department of Computer Science, University of New Mexico, Nov. 2012, 11 pages.

Factor, Michael, "Faster Cloud Computing", accessed online from http://thoughtsoncloud.com/index.php/2013/01/faster-cloud-computing/ on Apr. 11, 2013, 3 pages.

Naphade, Deepti et al., "Managing Workload Processor Resources on Cloud", IBM, 2013, 14 pages.

Non-Final Office Action, dated Jan. 30, 2015, U.S. Appl. No. 13/866,716, filed Apr. 19, 2013, Publication US 2014-0317265A1, published Oct. 23, 2014, In re James.

Final Office Action, dated Aug. 26, 2015, U.S. Appl. No. 13/866,716, filed Apr. 19, 2013, Publication US 2014-0317265A1, published Oct. 23, 2014, In re James.

Notice of Allowance, dated Dec. 14, 2015, U.S. Appl. No. 13/866,716, filed Apr. 19, 2013, Publication US 2014-0317265A1, published Oct. 23, 2014, In re James.

HARDWARE LEVEL GENERATED INTERRUPTS INDICATING LOAD BALANCING STATUS FOR A NODE IN A VIRTUALIZED COMPUTING ENVIRONMENT

CROSS REFERENCE TO RELATED APPLICATIONS

This application is a continuation of commonly assigned U.S. patent application Ser. No. 13/866,716, filed Apr. 19, 2013, which is hereby incorporated herein by reference.

BACKGROUND

1. Technical Field

This invention relates in general to a computing environment and more particularly to workload balancing in a virtualized computing environment through hardware level generated interrupts indicating a load balancing status for a node.

2. Description of the Related Art

Virtualized computing environments, such as cloud computing environments, include multiple computing nodes, each providing services for one or more selections of virtualized resources, such one or more virtual machines. Generally, a virtualized computing environment provides a software service for managing the distribution of workloads across the multiple computing nodes. As the number of computing nodes available in the virtualized computing environment increases, there are more computing nodes available for the software service to distribute workloads to, but also more computing nodes for the software service to monitor.

BRIEF SUMMARY

In view of the foregoing, there is a need for a method, system, and program product workload balancing in a virtualized computing environment through hardware level generated interrupts indicating a load balancing status for a node.

In one embodiment, a computing node comprises at least one hardware layer comprising a plurality of hardware resources, wherein the hardware resources comprise at least one processor and at least one memory. The computing node comprises at least one virtualization layer operative on the at least one processor communicatively connected to the at least one memory to manage at one virtual machine defined by at least one resource from among the plurality of hardware resources. The computing node comprises load balancing interrupt logic configured in the hardware layer of the computing node. The load balancing interrupt logic is operative to compare at least one resource utilization level of the plurality of hardware resources by the at least one virtual machine with at least one threshold. The load balancing interrupt logic is operative to generate at least one load balancing interrupt indicating at least one load balancing status of the computing node based on the comparison of the at least one resource utilization level with the at least one threshold by, responsive to the at least one resource utilization level being equal to or greater than the at least one threshold, generating a first load balancing interrupt indicating the computing node requires load balancing and responsive to the at least one resource utilization level being less than the at least one threshold, generating a second load balancing interrupt indicating the computing node is available for load balancing. The computing node further comprises a management partition in the virtualization layer operative to trap the second load balancing interrupt output from the hardware layer. The management partition, responsive to trapping the second load balancing interrupt, is operative to pass the second load balancing interrupt, via a network, to a node management layer, wherein the node management layer identifies the computing node as available to handle workloads and responsive to another computing node requiring load balancing for another virtual machine, queries the computing node to determine if the computing node is available to receive the another virtual machine.

In another embodiment, a processor system comprises at least one processor connected to at least one memory in a particular node from among a plurality of nodes. The processor system comprises a comparator operative to compare at least one resource utilization level of the at least one processor by at least one virtual machine running on the at least one processor in the particular node with at least one threshold. The processor system comprises the comparator, operative to generate at least one load balancing interrupt indicating at least one load balancing status of the at least one processor for the at least one virtual machine based on the comparison of the at least one resource utilization level with the at least one threshold by, responsive to the at least one resource utilization level being equal to or greater than the at least one threshold, generating a first load balancing interrupt indicating the computing node requires load balancing and responsive to the at least one resource utilization level being less than the at least one threshold, generating a second load balancing interrupt indicating the computing node is available for load balancing. The processor system comprises a management partition in a software layer of the particular node operative to trap the second load balancing interrupt output from comparator in a hardware layer. The management partition, responsive to trapping the second load balancing interrupt, is operative to pass the second load balancing interrupt, via a network, to a node management layer, wherein the node management layer identifies the particular computing node as available to handle workloads and responsive to another computing node of the plurality of nodes requiring load balancing for another virtual machine, queries the particular computing node to determine if the particular computing node is available to receive the another virtual machine In another embodiment, a method for reporting load balancing needs of a computing node is directed to comparing, at hardware level in a computing node, at least one resource utilization level of at least hardware resource by at least one virtual machine running in a software level on the at least one hardware resource with at least one threshold. The method is directed to, responsive to the at least one resource utilization level being equal to or greater than the at least one threshold, generating, at the hardware level, a first load balancing interrupt indicating the at least one virtual machine requires load balancing for the computing node. The method is directed to, responsive to the at least one resource utilization level being less than the at least one threshold, generating, at the hardware level, a second load balancing interrupt indicating the computing node is available for load balancing. The method is directed to trapping, by the software layer of the computing node, the second load balancing interrupt. The method is directed to, responsive to trapping the second load balancing interrupt, passing, by the software layer of the computing node, the second load balancing interrupt, via a network, to a node management layer, wherein the node management layer identifies the computing node as available to handle workloads and responsive to another computing node requiring load balancing for another virtual machine, queries the computing node to determine if the computing node is available to receive the another virtual machine.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for configuring a hardware layer of a node to generate a load balancing status of the node for triggering load balancing by software layers within a one or more types of computing environments including, but not limited to, a server cloud, to facilitate workload balancing within a cloud infrastructure and a non-cloud infrastructure.

In addition, embodiments of the invention provide a solution for enabling individual servers to vote for adjustments to the frequency and voltage of processors, the throttling of memory, the fan speed and the ambient temperature, to manage the heat dissipation from individual servers to affect the thermal environment within one or more thermal controlled areas.

Figure 1:
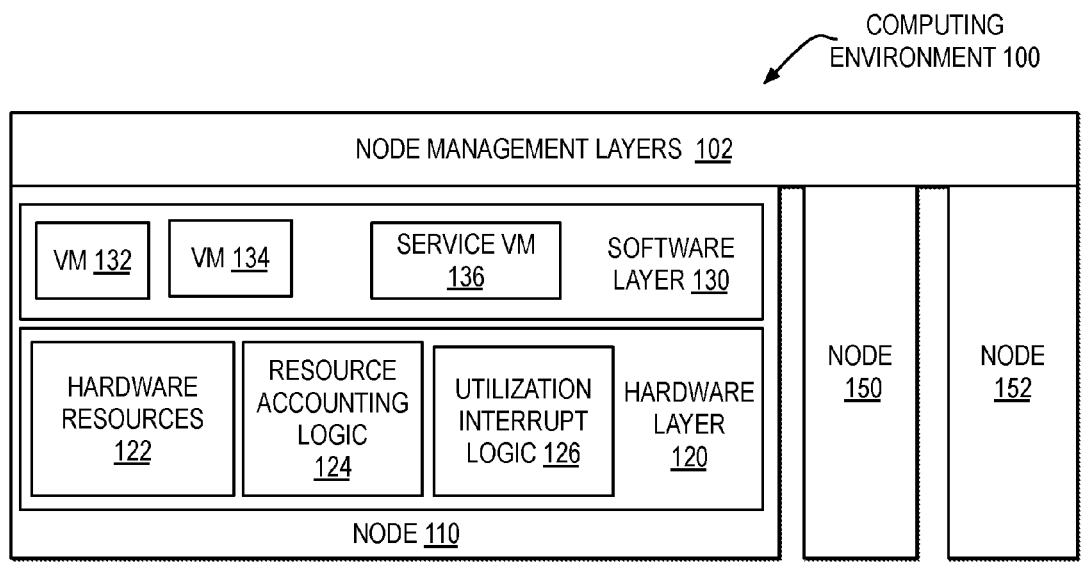
FIG. 1 is a block diagram illustrating one example of layers of a computing environment including at least one computing node with hardware for generating a load balancing interrupt indicating whether the computing node needs load balancing or whether the computing node is available to other computing nodes for loading balancing.

With reference now to the figures, and in particular with reference now to FIG. 1, a block diagram illustrates one example of layers of a computing environment including at least one computing node with hardware for generating a load balancing interrupt indicating whether the computing node needs load balancing or whether the computing node is available to other computing nodes for loading balancing.

In the example, a computing environment 100 includes multiple computing nodes, illustrated for purposes of example as node 110, node 150, and node 152. The nodes are connected via a network and interface with one another through node management layers 102. In one example, node management layers 102 may include one or more layers of cluster management controllers, one or more layers of load balancing services, and one or more layers of virtualization management services for managing computing environment 100. In addition, node management layers 102 may include one or more layers of management controllers to enable a peer-to-peer network architecture for facilitating communication between each of the nodes. Computing environment 100 may represent a computing environment comprising multiple nodes implementing one or more types of network architectures.

In the example, node 110 implements a hardware layer 120 including hardware resources 122. Hardware resources 122 may include, but are not limited to, processors, memory, network devices, network bandwidth, storage, I/O resources, and power. In one example, hardware resources 122 include physical resources from one or more computing systems. In another example, hardware resources 122 may also include virtual resources. In additional or alternate embodiments, hardware resources 122 may include additional or alternate types and configurations of hardware resources.

In the example, node 110 implements a software layer 130, which may include one or more layers of software for performing one or more types of functions including, but not limited to, managing virtualization of hardware resources 122 and managing services within node 110. In the example, software layer 130 may also be referred to as a virtualization layer.

In the example, software layer 130 includes one or more controllers or services for managing one or more virtual machines (VMs). In one example, virtual machines managed in software layer 130 include VM 132 and VM 134, where each of VM 132 and VM 134 is a collection of resources, such as virtual or physical processor, memory and I/O resources, from among hardware resources 122, that are defined to run an operating system and workload of node 110. Each VM may be virtualized as a separate computer. Each VM may host a separate operating system. Multiple VMs may access memory from a common memory chip, however, the ranges of addresses directly accessible to each of the VMs do not overlap. Processors may be dedicated to a single VM or shared by multiple VMs. In additional or alternate embodiments, software layer 130 may include only a single VM or may include additional or alternate VMs. In the example, VM 132 or VM 134 may also refer to or be referred to as a client logical partition, a logical partition, or a virtual server, for example.

In the example, software layer 130 includes a service VM 136, where service VM 136 is a collection of hardware resources from among hardware resources 122 that provides management and control services for node 110. For example, service VM 136 may control all the physical I/O resources within hardware resources 122. In the example, service VM 136 may also refer to or be referred to as firmware, a management partition, virtual machine, virtual server, management operating system, or VMware® Service Console, for example. Software layer 130 may also include additional or alternate components including, but not limited to, a hypervisor layer, a virtual machine manager, a virtualization manager, or other layers and components that provide the underlying software for managing virtualization of hardware resources 122 into VMs and enabling sharing of physical resources, from among hardware resources 122, between the VMs.

In the example, hardware layer 120 of node 110 is configured with resource accounting logic 124 for performing resource monitoring at hardware layer 120 of node 110. In one example, resource accounting logic 124 monitors the utilization of hardware resources 122 by each of the VMs by sampling resource utilization across sample windows. In one example, resource accounting logic 124 separately monitors the utilization of hardware resources 122 for each of the VMs and also separately monitors the utilization of hardware resources for each of the VMs by type of hardware resource. In one example, resource accounting logic 124 counts values indicated the utilization of hardware resources 122 over a sampling window, such as one clock cycle, into separate registers. In one example, resource accounting logic 124 may flush the register values to memory at the end of each sample window period or after a change in the status of a virtual machine being monitored, such as if a hypervisor time slices a virtual machine out to perform a hypervisor function.

In one example, resource accounting logic 124 counts values indicating resource utilization including, but not limited to, processor utilization as a means to remaining capacity projection, processor work rate, processor time spent per virtual machine, memory capacity, memory bandwidth, network bandwidth, network transaction rates, storage input/output operations per second (TOPS), and power. In the example, resource accounting logic 124 may record the utilization of each processing unit separately since processor units may be shared among multiple virtual machines. In additional or alternate embodiments, resource accounting logic 124 may count additional or alternate values indicating resource utilization at hardware layer 120.

In the example, hardware layer 120 of node 110 may also be configured with utilization interrupt logic 126. Utilization interrupt logic 126 compares the resource utilization values sampled by resource accounting logic 124 in real-time with one or more programmable thresholds. If the resource utilization values for a sampling window are greater than a specified threshold, utilization interrupt logic 126 generates a load balancing interrupt that indicates that the computing node requires load balancing help, also referred to as a "need help" load balancing interrupt. If the resources utilization values for a sampling window are not greater than the threshold, utilization interrupt logic 126 generates a load balancing interrupt that indicates that the computing node has resources available to help balance workloads, also referred to as a "can help" load balancing interrupt.

In addition, utilization interrupt logic 126 may include multiple levels of comparator logic, with multiple programmable thresholds, for generating additional or alternate types of load balancing interrupts to meet performance requirements for computing node 110 within computing environment 100, such as performance requirements set in a service level agreement. In particular, since node 110 may handle different workloads with different service level agreements at different times, utilization interrupt logic 126 may be configured with multiple levels of comparator logic that are programmable to meet multiple types of service level agreement settings, at a hardware level. In one example, a service level agreement may be specified by a client needing to run a workload in computing environment 100, at a management layer. One or more services of node management layers 102 or of software layer 130, such as service VM 136, may automate the translation of a service level agreement received for a workload into thresholds for programming into utilization interrupt logic 126 for handling workloads under the service level agreement and service VM 136 or another controller of node 110 may automate the programming of the programmable thresholds into utilization interrupt logic 126.

In one example, in addition to including logic for generating a "need help" load balancing interrupt and a "can help" load balancing interrupt, utilization interrupt logic 126 may include logic for generating a "normal" load balancing interrupt when resource utilization values for a sampling window are less than the "need help" threshold and greater than the "can help" threshold. Utilization interrupt logic 126 may also generate multiple degrees of "need help" or "can help" load balancing interrupts. For example, utilization interrupt logic 126 may generate a first level "need help" load balancing interrupt when resource utilization values reach a first threshold, such as 70%, and generate a second level "need help" load balancing interrupt when resource utilization values reach a second threshold, such as 90%. In one example, the different degrees of "need help" load balancing interrupts may be trapped by different layers within node 110, such as software layer 130 trapping the first level "need help" load balancing interrupt triggers and both software layer 130 and hardware layer 120 trapping the second level "need help" load balancing interrupt triggers.

In one example, load balancing is described herein with reference to the ability, within computing environment 100 with one or more virtualized resource layers, to balance workloads between virtual machines in a computing node or to balance workloads between different computing nodes in computing environment 100. In another example, load balancing may include other types of workload management within computing environment 100 in order to meet service level agreements, policies, and other requirements specified within one or more layers of computing environment 100.

In one example, a load balancing interrupt output by hardware layer 120 is a dedicated output signal that is either fired on when generated or is off. A "can help" load balancing interrupt may be specified as one signal and a "need help" load balancing interrupt may be specified as another signal. In the example, because a separate load balancing interrupt may be specified for each type of hardware resource monitored, hardware layer 120 may generate a "need help" load balancing interrupt for memory resources concurrent with generating a "can help" load balancing interrupt for processor resources. To generate a separate load balancing interrupt for each hardware resources, the threshold value compared by utilization interrupt logic 126 against the utilization statistics for each type of hardware resource may be set to meet the policies and service level agreements for the compute node, for virtual machines, and for individual workloads. In addition, the threshold value for each type of hardware resource set in utilization interrupt logic 126 may be dynamically programmable to reflect the current policies and service level agreements for the virtual machines currently on the computing node and the workloads currently running on the virtual machines.

In the example, one or more software layers from among software layer 130 and node management layers 102 may be specified to trap the load balancing interrupts fired by utilization interrupt logic 126 from hardware layer 120. In one example, to trap load balancing interrupts within software layer 130 running local on computing node 110, service VM 136 may be specified to trap the load balancing interrupts fired by utilization interrupt logic 126 from hardware layer 120. In other examples, other components within software layer 130 may be specified to trap the load balancing interrupts fired from hardware layer 120.

In one example, each load balancing interrupt is output through a separate special pin and a microcontroller on the side is implemented to watch the pin and run code to trap the interrupt for service VM 136. In another example, each load balancing interrupt is output as a hardware managed interrupt that causes software from software layer 130 currently running to stop and causes a controller of software layer 130 specified to handle the interrupt to run to handle the interrupt. The controller of software layer 130 specified to handle the interrupt may include service VM 136, or may include another controller, such as a hypervisor, that handles the interrupt and passes the interrupt to service VM 136. In another example, service VM 136 may be time sliced in to run on an interval and detects any changes that have occurred at the hardware level during the interval, such as detecting any load balancing interrupts output by utilization interrupt logic 126 during the interval. The examples described as to the hardware for generating load balancing interrupts and the software for trapping and handling load balancing interrupts are illustrative examples, and the invention is not limited thereto. In additional or alternate embodiments, additional and alternate types of software and hardware may be implemented to enable utilization interrupt logic 126 to output hardware based load balancing interrupts and for software layer 130 of computing node 110 to detect and handle hardware based load balancing interrupts.

In one example, a load balancing interrupt may also trigger one or more processors in hardware layer 120 to stop and run service VM 136 to handle load balancing needs. In one example, service VM 136 may perform multiple service functions and may not be scheduled on one of multiple processors until triggered to run. In the example, one or more processors of hardware resources 122 may be specified to run service VM 136 when service VM 136 is triggered to perform load balancing through load balancing interrupts, and the specified processors may receive load balancing interrupts and stop to run the load balancing services of service VM 136. In additional or alternate embodiments, load balancing interrupts may be used to trigger additional or alternate elements within hardware layer 120 to stop, to stop and perform another hardware related function, or to stop and run code from software layer 130.

In one example, if service VM 136 traps a "need help" load balancing interrupt, service VM 136 evaluates in-memory utilization statistics for the sampling window flushed to memory from resource accounting logic 124, determines which one or more particular VMs need help based on the utilization statistics, and passes a "need help" load balancing interrupt event and a request to move the particular VMs to node management layers 102. In one example, the hardware generated load balancing interrupts may occur in real-time, as resource utilization is sampled in hardware layer 120, whereas software polling by service VM 136 will have some delay associated with the polling interval and requires periodically stopping a processor from handling other functions, to handle software polling requests by service VM 136. Thus, in one example, by setting the particular threshold levels applied in utilization interrupt logic 126 to generate "need help" load balancing interrupts at the hardware level, the hardware generated load balancing interrupts provide real-time policy based triggers for triggering node 110 to request load balancing to meet service level agreements at the node level, including service level agreements specified by node management layers 102. In addition, in one example, by setting the particular threshold levels applied in utilization interrupt logic 126 to generate "need help" load balancing interrupts at the hardware level, to meet service level agreements in real-time, rather than software layer 130 needing to periodically poll hardware layer 120 for utilization statistics and analyzing the utilization statistics to determine whether node 110 requires any load balancing, software layer 130 can wait for utilization interrupt logic 126 to fire "need help" load balancing interrupts to request load balancing for node 110.

In the example, if service VM 136 traps a "can help" load balancing interrupt, service VM 136 passes a "can help" load balancing interrupt event to node management layers 102 to trigger node management layers 102 to record node 110 as available to help balance workloads. In one example, when service VM 136 traps an available load balancing interrupt, service VM 136 passes the "can help" load balancing interrupt event to node management layers 102 without needing to read the utilization statistics for hardware resources 120, to minimize the amount of network traffic and computational resources required to report to node management layers 102 that computing node 110 is available for load balancing. In addition, in the example, by setting the particular threshold levels applied in utilization interrupt logic 126 is generate "can help" load balancing interrupts at the hardware level, rather than software layer 130 needing to periodically poll hardware layer 120 for utilization statistics and analyzing the utilization statistics to determine whether node 110 is available for load balancing, software layer 130 can wait for a "can help" load balancing interrupt and pass a "can help" load balancing interrupt event to node management layers 102 to indicate the availability of node 110 to help with load balancing.

In the example, node management layers 102 may include one or more layers configured to trap load balancing interrupts and one or more controllers for moving VMs from one node to another node and for replicating a VM on a node. In the example, if node management layers 102 trap a "need help" load balancing interrupt event from a computing node and a move request for a particular VM, node management layers 102 may determine one or more candidate nodes that are available for load balancing, such as node 150 and node 152. Next, node management layers 102 may query the candidate nodes to determine whether each candidate node is able to help with the particular VM. Candidate nodes may calculate a best fit value for the candidate node to help with the particular VM and return the best fit value. In one example, the best fit value may represent a value representative of the risk, as assessed by the node, of the node taking an additional workload and meeting performance requirements in one or more policies. Node management layers 102 select, from among the candidate nodes returning a best fit value, a best fit node, and move the particular VM to the best fit node. Optionally, if the particular VM can be replicated to avoid overutilization, node management layers 102 may select the best fit note and service VM 136 may coordinate replication of the particular VM on the best fit node.

In the example, if node management layers 102 receive a "can help" load balancing interrupt event, node management layers 102 may update a record for the computing node with the interrupt status of "available". In one example, node management layers 102 may maintain a help status list of computing nodes indicating a status of "available", such that when node management layers 102 needs to determine candidate nodes for load balancing, node management layers 102 first consults the help status list to select candidate node with a recently indicated load balancing interrupt status of "available".

In the example, software layer 130 is able to dynamically reconfigure resource allocations within VM 132 and 134 without restart, including dynamic logical partitioning. In particular, software layer 130, through service VM 136 or another service, may enable memory, CPU capacity, I/O interfaces and other hardware resources to be moved non-disruptively between VMs within the same server.

In addition, in the example, one or more services of node management layers 102 may control moving an active VM from one node to another node without being deactivated. Node management layers 102 may coordinate the movement of an active VM from one node to another node by connecting service VMs of the nodes. In one example, to management movement of a VM from one node to another node, the source and the target nodes may be required to have access to the same network and storage area networks, but not need to be of the same type. In one example, when a VM is moved from a source node to a target node, the memory content of the VM is copied asynchronously from one system to another to create a clone of the partition until a threshold is reached, then the VM is transitioned to the target node and any remaining pages are copied synchronously. In other embodiments, other types of brokering of VMs and resources may be controlled.

In the example, since one or more layers in computing environment 100 may be configured to trap load balancing interrupts fired from utilization interrupt logic 126 of hardware layer 120 of node 110, at least as to node 110, no software layers are required to poll hardware layer 120 of node 110 to determine whether node 110 needs any load balancing or whether node 110 is available receive workloads from another computing node. In contrast, if a node does not include utilization interrupt logic 126 for generating load balancing interrupts to trigger load balancing actions for the node, in order to manage workloads on the node, one or more software layers, such as a service VM of the node or node management and virtualization layers 102 may include a software agent that polls one or more of a hardware layer and a service VM layer of the node to accumulate utilization statistics for the node to use in making decisions about load balancing. When a software layer is required to poll one or more of a hardware layer and a server VM layer of a node, each polling request generates network traffic and requires additional computing resources for the layers to send and respond to the polling request and analyze the utilization statistics returned. In addition, when a software layer is required to poll a hardware layer of a node for utilization statistics, the software layer may be required to wait until a sampling window is complete or halt a sampling period to access utilization statistics, placing additional computational burden on the hardware layer and receiving the utilization statistics with a delay. As the number of nodes in computing environment 100 increases, if software polling is required, network traffic is generated and additional computing resources are required to handle software polling. In contrast, if hardware layer 120 of a node includes utilization interrupt logic 126 for generating load balancing interrupts in real-time indicating the need for load balancing or the availability of the node for handling workloads, the need for software polling and massive information discoveries, which are must less efficient than utilization interrupt logic 126, is removed or reduced.

As will be further described with reference to FIGS. 5, 6, and 7, computing environment 100 may represent a server cloud environment with multiple cloud computing nodes, and each of node 110, node 150, and node 152 may represent one or more cloud computing nodes. In the example, software layer 130 and node management layer 102 may represent one or more management functions within a cloud environment, and one or more cloud computing nodes may support each management function.

In one example, where node management layers 102 represents one or more management functions within a could environment and node 110, node 150, and node 152 represent one or more cloud computing nodes, node management layers 102 may include a cloud level management service for interacting with one or more cluster level services providing node management layers 102. Node management layers 102 may distribute service level agreements to one or more nodes and may direct one or more software controllers to set programmable thresholds in utilization interrupt logic 126 to meet the service level agreements.

One of ordinary skill in the art will appreciate that while resource accounting logic 124 and utilization interrupt logic 126 are described with reference to hardware logic performed in hardware layer 120, one or more functions of resource accounting logic 124 and utilization interrupt logic 126 may be performed by a combination of hardware and one or more types of software elements including software in software layer 130 and microcontrollers for running code embedded in hardware layer 120. In addition, one or more of resource accounting logic 124 and utilization interrupt logic 126 may be performed by a service in software layer 130 or in another layer of node 110 outside of hardware layer 120 or in a layer of node management layers 102.

Figure 2:
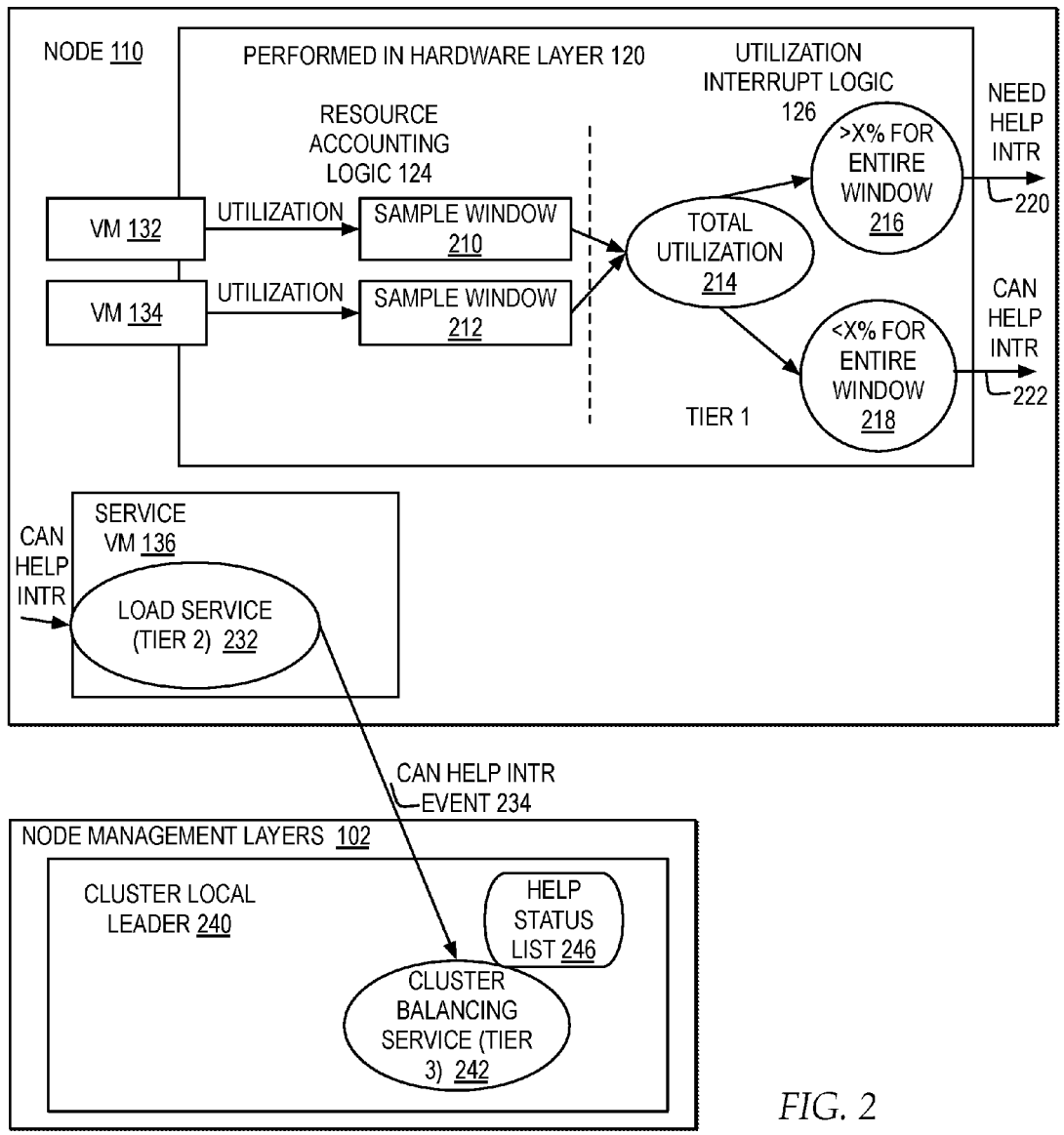
FIG. 2 is a block diagram illustrating one example of software layers performing load balancing in a computing environment including a computing node with hardware for generating a load balancing interrupt indicating that the computing node is available to other computing nodes for load balancing.

FIG. 2 illustrates a block diagram of one example of software layers performing load balancing in a computing environment including a computing node with hardware for generating a load balancing interrupt indicating that the computing node is available to other computing nodes for load balancing.

In the example, resource accounting logic 124, performed in hardware layer 120, includes one or more sample windows in which utilization of resources by VM 132 and VM 134 are separately measured, illustrated as a sample window 210 and a sample window 212, respectively. In additional or alternate embodiments, resource accounting logic may implement additional or alternate resource utilization measurement components. In addition, in additional or alternate embodiments, in addition to implementing a separate sampling window per VM, resource accounting logic 124 may implement a separate sampling window per VM and per type of resource monitored within the VM.

In the example, utilization interrupt logic 126 includes total utilization logic 214 for combining the utilization values in sample window 210 and sample window 212. In one example, total utilization logic 214 may sum utilization values from multiple sample windows. In another example, total utilization logic 214 may average the utilization values and calculate a percentage of utilization of a resource. Total utilization logic 214 may be configured to calculate different types of values depending on the type of resource and the type of resource utilization statistics calculable for each type of resource.

In addition, utilization interrupt logic 126 includes a comparator 216 for comparing the total utilization vales with a threshold "X" for the entire window, and if the total utilization values are greater than X, firing a "need help" load balancing interrupt 220. In addition, utilization logic 126 includes a comparator 218 for comparing the total utilization values with a threshold "X" for the entire window, and if the total utilization values are less than X, firing a "can help" load balancing interrupt 222. In the example, while both comparator 216 and comparator 208 have the same programmable threshold value X, in other embodiments, each comparator may have a different programmable threshold value. In the example, comparator 216 and comparator 218 may include additional comparison layers to minimize the firing of interrupts during temporary usage spikes.

In the example, a load service 232 of service VM 136 traps "can help" load balancing interrupt 222 and passes a "can help" load balancing interrupt (INTR) event 234 to a cluster local leader 240 within node management layers 120. A cluster balancing service 242 of cluster local leader 240 detects the "can help" load balancing interrupt events from node 110 and updates the status of node 110 in a help status list 246.

In the example, by comparing the total resource utilization over a sample window against a threshold X at the hardware level and generating "can help" load balancing interrupt 222 at the hardware level, shown as "tier 1", minimal logic is required to determine whether node 110 is available to help with load balancing in a computing environment. In addition, a simplified, single interrupt is fired from hardware layer 120, which can be trapped by and passed through software layers, shown as "tier 2" and "tier 3", to indicate that node 110 is available to help with load balancing within a computing environment. In contrast, if node 110 did not include utilization interrupt logic 126 to fire "can help" load balancing interrupt 222 indicating the availability of node 110 to help with load balancing, in order for node 110 to have load balancing services in a computing environment, service VM 136 may include an additional polling agent service to periodically poll resource accounting logic 124 for the values in sample window 210 and sample window 212. In the example, interactions between software layer 130 and hardware layer 120, particularly where software layer 130 implements virtualization of resources, may include sending traffic through network interfaces and require additional computational resources, to retrieve resource utilization statistics from resource accounting logic 124 and to also analyze the resource utilization statistics, to determine whether node 110 is available to help with load balancing in a computing environment. As the number of nodes increases, if nodes are constantly performing software polling to access resource utilizations statistics, the amount of network traffic caused by software polling also increases significantly and the resources required to move around massive amounts of resource utilization statistics also increases. Therefore, while a service in a software layer may poll hardware layer 120 for utilization statistics and perform the same analysis as utilization interrupt logic 126 to determine whether a node 110 is available to help with load balancing, the use of a software layer creates network traffic and requires additional computational resources that are not required when the same determination is made by utilization interrupt logic 126 at the hardware level.

Figure 3:
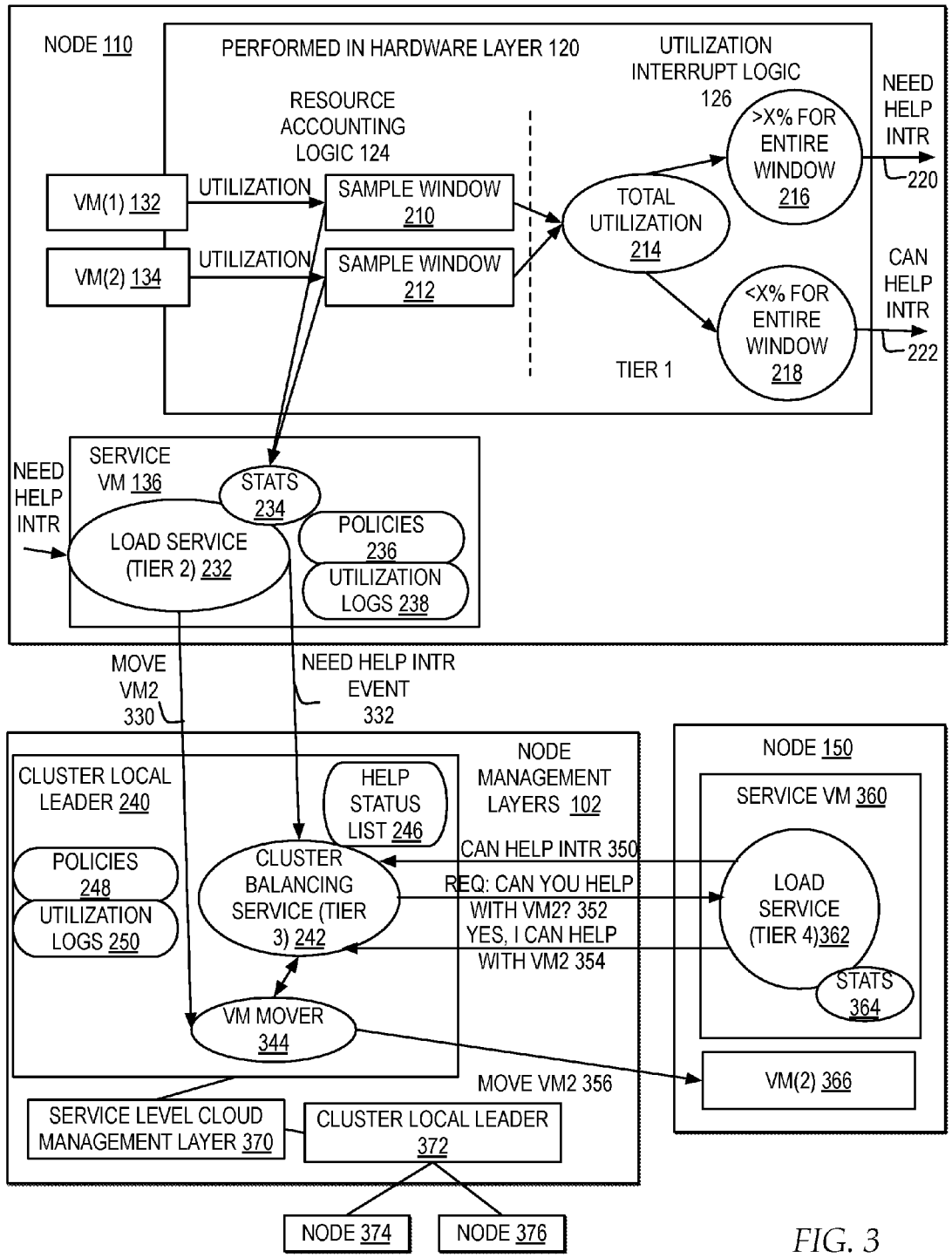
FIG. 3 is a block diagram illustrating one example of software layers performing load balancing in a computing environment including a computing node with hardware for generating a load balancing interrupt indicating that the computing node requires load balancing.

FIG. 3 illustrates a block diagram of one example of software layers performing load balancing in a computing environment including a computing node with hardware for generating a load balancing interrupt indicating that the computing node requires load balancing.

As previously described with reference to FIG. 2, utilization interrupt logic 126 may generate "need help" load balancing interrupt 220 if the total utilization is greater than a threshold value X for an entire sampling window. In the example, load service 232 of service VM 136 may trap "need help" load balancing interrupt 220, and upon trapping "need help" load balancing interrupt 220, read the values for sample window 210 and sample window 212 from memory, as stats 234. In particular, in the example, while total utilization logic 214 may combine the resource utilization from sample window 210 and sample window 212 for comparison against a threshold, load service 232 may read the separate values for sample window 210 and sample window 212 in order to graph the resource utilization per VM and determine which VM should be moved. In particular, in the example, load service 232 may analyze stats 234, along with one or more polices 236 set for load service 232 and previously monitored metrics in utilization logs 238. From the analysis, load service 232 may select at least one VM that needs to be moved to another node. In an alternate embodiment, load service 232 may also pass stats 234 on to another service that determines which VM to move to another node. Load service 232 may also add stats 234 to utilization logs 238 for future use.

In the example illustrated, load service 232 is a plugin or component of service VM 136. In another example, load service 232 may be implemented independent of service VM 136 within software layer 130.

In the example, load service 232 pushes a "need help" load balancing interrupt event 332 to node management layers 102. In addition, if load service 232 selects at least one VM to be moved, load service 232 may push a move request 330 to node management layers 102, such as "move VM2", where "VM2" identifies the selected VM to be moved.

In the example, cluster balancing service 242 within node management layers 102 listens for load balancing interrupt events from one or more nodes. In the example, when cluster balancing service 242 detects "need help" load balancing interrupt event 332 passed from node 110, cluster balancing service 242 may also monitor whether move VM 330 request has been sent for a selected VM of node 110 to VM mover 344 In the example, load service 232 selects at least one VM to be moved, such as "VM2", and sends a "move VM2" request to a VM mover 344 of cluster local leader 240 along with passing "need help" load balancing interrupt 332 event to cluster load service 242. In another example, cluster balancing service 242 may select the VM to be moved. In addition, load service 232 may forward the "need help" load balancing interrupt event with the selected VM specified in the event.

In the example, cluster balancing service 242 may select at least one candidate node for receiving a selected VM. In one example, cluster balancing service 242 may select at least one candidate node by checking whether there are any nodes reporting availability to help with load balancing per help status list 246 and further filter candidate node selections based on policies 248 and utilization logs 250. Utilization logs 238 and utilization logs 250 may include short term historical data including, but not limited to, peaks, valleys, frequencies, averages, trending, and current data for use in optimizing resource use. In addition, utilization logs 250 may include longer term time and date dependent patterns determined by cluster balancing service 242 to predict future resource contention and optimize workload combinations for initial placement. Policies 248 may include policies for managing multiple types of system capabilities including, but not limited to, bidding, brokering, and reserving workloads for load balancing to optimize resources. Policies 248 may include policies for workload sampling and may include policies for workload types including, but not limited to, priorities, colocation, anti-colocation, reliability, power constraints, locally managed, sticky, moveable, cancelable, restartable, and fault tolerant/stateless, which may define or specify parameters for desired high availability failover characteristics.

In the example, load service 242 has received a "can help" load balancing interrupt 350 from node 150, as illustrated at reference numeral 350, and has updated help status list 246 to indicate node 150 is available for load balancing. In response to receiving "need help" load balancing interrupt event 332 from node 110, load balancing service 242 may identify node 150 as a candidate node for receiving "VM2". In the example, cluster balancing service 242 sends a request 352 to node 150 asking whether node 150 can help with "VM2". Load service 362 within service VM 360 handles request 352 and calculates, based on stats 364 reflecting current resource utilization by node 150, along with policies and utilization logs, a best fit value for node 150 to handle "VM2". Load service 362 returns a response 354 to cluster balancing service 242 indicating that node 150 can help with "VM2" and the best fit value. Cluster balancing service 242 collects best fit values received from one or more candidate nodes and selects a best fit node based on the best fit values returned and policies 248. VM mover 344 coordinates between service VM 136 and service VM 360 to move VM2 from node 110 to node 150, as illustrated as reference numeral 356. In the example, VM2 is originally reflected in node 110 as VM(2) 134 and is moved to node 150 as VM(2) 356.

Optionally, if a selected VM has a property that allows the VM to be replicated to avoid overutilization, load service 232 may send "need help" load balancing interrupt 332 and specify that the request is for replication. Cluster balancing service 242 may identify a best fit node and notify service VM 136 of the best fit node, such as node 150. Service VM 136 may directly contact the service VM of the best fit node, such as service VM 360, and coordinate replication of the VM to the best fit node.

In the example, by comparing the total resource utilization over a sample window against a threshold X at the hardware level and generating "need help" load balancing interrupt 220 at the hardware level, shown as "tier 1", minimal logic is required to determine whether node 110 requires load balancing help in a computing environment. In addition, a simplified, single interrupt is fired from hardware layer 120, which can be trapped by and passed through software layers, shown as "tier 2" and "tier 3", to indicate that node 110 needs help with load balancing within a computing environment. In contrast, if node 110 did not include utilization interrupt logic 126 to fire "need help" load balancing interrupt 220 indicating that node 110 needs help with load balancing, in order for node 110 to have load balancing services in a computing environment, service VM 136 may include an additional polling agent service to periodically poll resource accounting logic 124 for the values in sample window 210 and sample window 212, graph the sample utilization values, compare the values against policies, and determine whether the node requires load balancing help. In the example, interactions between software layer 130 and hardware layer 120, particularly where software layer 130 implements virtualization of resources, may include sending traffic through network interfaces and require additional computational resources, to retrieve resource utilization statistics from resource accounting logic 124 and to also analyze the resource utilization statistics, to determine whether node 110 is requires load balancing help in a computing environment. As the number of nodes increases, if nodes are constantly performing software polling to access resource utilizations statistics, the amount of network traffic caused by software polling also increases significantly and the resources required to move around massive amounts of resource utilization statistics also increases. Therefore, while a service in a software layer may poll hardware layer 120 for utilization statistics and perform the same analysis as utilization interrupt logic 126 to determine whether a node 110 requires help with load balancing, the use of a software layer creates network traffic and requires additional computational resources that are not required when the same determination is made by utilization interrupt logic 126 at the hardware level. Moreover, utilization interrupt logic 126 may be configured on chip, along with resource accounting logic 124, such that no network traffic is generated for utilization interrupt logic 126 to determine whether a node requires load balancing help or is available for load balancing.

In the example, while the first layer of node management layers 102 is described with reference to a cluster local leader layer, in other embodiments, other layers may be included between a computing node layer and a cluster local leader layer. In addition, in other embodiments, nodes may be managed in a configuration other than a cluster where a peer-to-peer relationship is maintained between the nodes and the functions described with reference to the cluster local leader layer may be implemented by a different types of node configuration controller.

In the example, at the node level and at the cluster local leader level, using the information provided by load balancing interrupts generated at the hardware level, node level service VMs, such as service VM 136, responding to load balancing interrupts at the software level within a compute node, and cluster logic leaders, such as cluster local leader 240, responding to load balancing interrupt events broadcast from the node level and performing load balancing the nodes, clusters of nodes in a computing environment are able to automate capacity management, self optimize, self regulate, and automate responses.

A computing environment may include multiple cluster local leaders, each managing load balancing across multiple compute nodes, such as cluster local leader 240 managing load balancing across node 110 and node 150 and a cluster local leader 372 managing load balancing across a node 374 and a node 376. As a result, a cloud management layer operating above a cluster local leader layer, such as a service level cloud management layer 370, is able to receive performance statistics from multiple cluster local leaders, such as cluster local leader 240 and cluster local leader 372, each balancing workloads across multiple compute nodes, and perform additional analysis to efficiently balance workloads across the multiple compute nodes available in a cloud computing environment.

In one example, individual nodes and a cluster of nodes managed by a cluster local leader, in response to load balancing interrupts generated at the node hardware level, automate capacity management by advertising capacity. Nodes and cluster local leaders may locally accumulate capacity information from utilization statistics, collected in response to load balancing interrupts. Nodes and cluster local leaders may advertise, or otherwise push, capacity updates through load balancing interrupt events and other types of events or communications to other clusters and to other layers of node management layers 102, such as cloud management layer 370. Nodes and cluster local leaders may retain, in utilization logs 238 and utilization logs 250, for example, light weight histograms of resource consumption patterns within nodes and within clusters of nodes and classify work according to resource usage patterns.

In one example, individual nodes and a cluster of nodes managed by a cluster local leader, in response to load balancing interrupts generated at the node hardware level and requests from a cluster local leader to receive loads during load balancing, may perform expedited risk and resource analytics. Load service 362 of service VM 360, using stats 364 and other policies, may analyze the risk of accepting new work against current real time commitments and resource utilization trending in stats 364. Load service 362 may determine, based on current thresholds programmed in the utilization interrupt logic of node 150, whether to allow for additional workload commitments given the current threshold settings. Load service 362 may determine to allow high levels of workload commitments when the service level agreement parameters for the workloads are less restrictive and lower levels of workload commitments when the service level agreement parameters for the workloads are more restrictive. Load service 362 may calculate a best fit value indicating the risk level of load service 362 handling a workload given current workload commitments. Load service 362 may calculate a best fit value indicating the cost associated with using the computing node for a VM. Cluster local leaders and load services may work together to optimize workloads and resources to handle VMs at the lowest cost, while meeting service level agreement parameters and policies.

In one example, individual nodes and a cluster of nodes managed by a cluster local leader, in response to load balancing interrupts generated at the node hardware level, self regulate by automatically detecting resource contentions. In the example "need help" hardware generated load balancing interrupts triggers alerts indicating resource contention between VMs based on real-time resource utilization statistics accumulated at the hardware level. "Need help" hardware generated load balancing interrupts trigger the software layer of a computing node to handle resource contentions as they are detected at the hardware level and the same resource utilization statistics that triggers the load balancing interrupts are also accessible to the software layer to analyze to determine which VM is contributing to the resource contention issue and to determine which VM has priority.

In one example, individual nodes and a cluster of nodes managed by a cluster local leader, in response to load balancing interrupts generated at the node hardware level, automate responses by nodes and cluster leaders responding to load balancing interrupts based on policies set at each software layer. In the example, each software layer, whether in a node or in one of node management layers 102, may include policies to respond to load balancing interrupts or load balancing interrupt events. Policies may include, but are not limited to, fast, low cost actions such as immediately performing actions to stop, hibernate, or throttle workloads based on workload types and priorities. Policies may include slower, higher cost options such as moving a VM. Policies may include automatically locating and analyzing target nodes. Policies may include additional parameters and actions specified to meet the parameters of one or more service level agreements for one or more workloads.

Cluster local leaders and cloud management layer 370, in response to receiving load balancing interrupt events from computing nodes, from cluster local leaders, or from other software layers, and in response to accessing utilization statistics pushed or pulled from the hardware layer of one or more computing nodes may perform additional load functions according to one or more policies specified for a computing environment. In one example, for performing cloud management functions within a cloud environment, one or more layers within node management layers 102 may efficiently perform, based on hardware generated load balancing interrupts, utilization statistics, and best fit values reported by computing nodes, additional load balancing functions, even as the number of computing nodes increases to the thousands. One or more layers within node management layers 102 may determine, in response to hardware level load balancing interrupts where there is capacity within the computing environment for one or more workloads, where is the best place to send a workload within the computing environment. One or more layers within node management layers 102 may determine, in response to hardware level load balancing interrupts, whether all the compute node resources are being optimized and how to optimize the resources. One or more layers within node management layers 102 may determine, in response to hardware level generated interrupts and best fit value responses, what computing nodes have the most risk for not performing to meeting service level agreements and how much risk is present within the computing environment. One or more layers within node management layers 102 may perform automated detection of and automated responses to problems within the computing environment based on node level hardware generated load balancing interrupts. One or more layers within node management layers 102 may determine which workloads have service load agreements and select compute nodes that include utilization interrupt logic enabled to trigger load balancing interrupts that will enable the compute nodes to load balance and meet the parameters in the service level agreements. One or more layers within node management layers 102 may gather load balancing interrupts and load balancing interrupt events and determine the most efficient way to use unused capacity in node without impacting business applications and ongoing workload commitments.

In the example, as illustrated, while software alone may perform many load balancing functions, as the number of nodes in a cloud computing environment increases, the layers of virtualization increase, and the parameters in service level agreements for workloads vary, by implementing hardware level, and chip level, hardware logic to perform real-time monitoring of resource utilization levels, compare the real-time levels against programmable thresholds set to meet service level agreement parameters and other policies, and trigger load balancing interrupts indicating a load balancing status of the hardware, the software layers implemented in a cloud computing environment are pushed triggers to more efficiently and accurately respond to load balancing needs within a cloud computing environment and to provide cloud clients with expected workload performance results.

Figure 4:
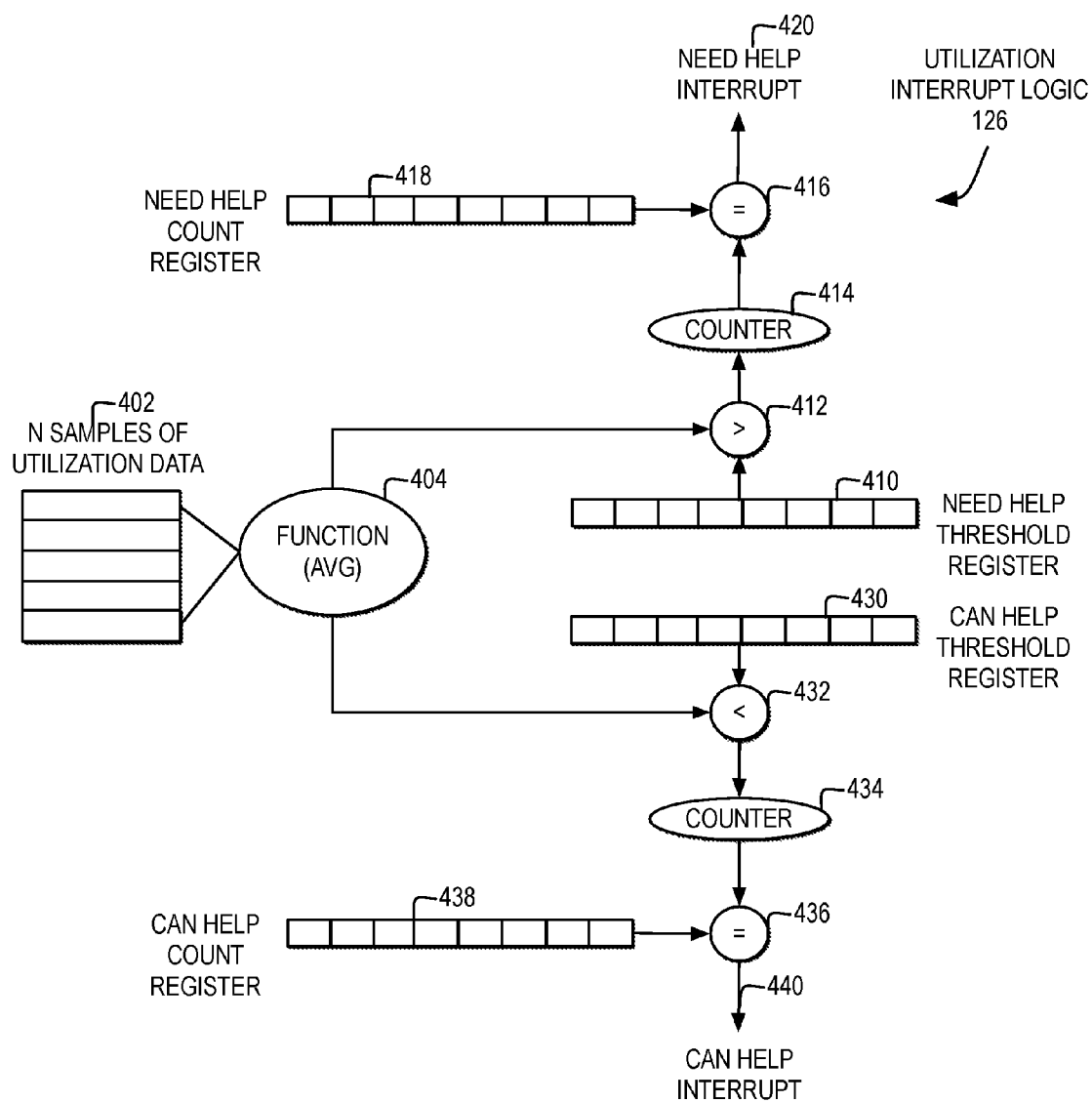
FIG. 4 is a block diagram illustrating one example of logic components of utilization interrupt logic.

FIG. 4 illustrates a block diagram of one example of components of utilization interrupt logic. As illustrated, the components, layers, and functions shown in FIG. 4 are intended to be illustrative only, and the invention is not limited thereto.

In one example, utilization interrupt logic 126 access multiple samples of utilization data 402 sampled by resource accounting logic 124, including, but not limited to, processor usage, memory usage, cache hits, and other resource statistics representing resource utilization in a node. Utilization interrupt logic 126 includes a function component 404 for combining N samples of utilization data 402 by averaging, to calculate a total utilization of a resource.

In one example, utilization interrupt logic 126 includes a need help threshold register 410 into which a need help threshold value is loaded indicating a maximum utilization level for a resource before load balancing may become necessary. In addition, utilization interrupt logic 126 includes a can help threshold register 430 into which a can help threshold value is loaded indicating a maximum utilization level for a resource, where if the utilization level for the resource is less than the maximum utilization level, the resource is available for load balancing. In one example, need help threshold register 410 and can help threshold register 430 are dynamically programmable and may be dynamically adjusted according to policies, usage, and other factors, during operation.

In addition, in one example, utilization interrupt logic 126 includes a need help count register 418 into which a need help threshold count value is loaded indicating a maximum number of cycles that resource utilization should exceed the value in need help threshold register 410 before need help interrupt 420 is generated. In addition, utilization interrupt logic 126 includes a can help count register 438 into which a can help threshold count value is loaded indicating a maximum number of cycles that resource utilization should be less than the value in can help threshold register 430 before can help interrupt 440 is generated. In one example, need help count register 418 and can help count register 438 are dynamically programmable and may be dynamically adjusted according to policies, usage, and other factors, during operation.

In one example, utilization interrupt logic 126 includes a comparator 412 for comparing a total utilization averaged by function component 404 with the value in need help threshold register 410. In the example, if the total utilization is greater than the value in need help threshold register 410, comparator 412 outputs a signal to increment a counter 414. Utilization interrupt logic 126 includes a comparator 416 for comparing the value in counter 414 with a value in need help count register 418 and generating need help interrupt 420 if the values are equal.

In one example, utilization interrupt logic 126 includes a comparator 432 for comparing a total utilization averaged by function component 404 with the value in can help threshold register 430. In the example, if the total utilization is less than the value in can help threshold register 430, comparator 432 outputs a signal to increment a counter 434. Utilization interrupt logic 126 includes a comparator 436 for comparing the value in counter 434 with a value in can help count register 438 and generating can help interrupt 440 if the values are equal.

In one example, function component 404 combines N samples of utilization data 402 including CPU utilization values each clock cycle. To meet policies related to CPU load balancing for a compute node, need help threshold register 410 may be loaded with a value representative of a percentage of total utilization above which load balancing may be triggered, such as a value representative of 90% utilization of one or more CPUs. The policies for a compute node may be set such that it is preferable to avoid triggering need help interrupt 420 for small spikes in CPU usage above 90% that only last for a minimal number of clock cycles. In one example, to avoid triggering need help interrupt 420 for small spikes in CPU usage, need help count register 418 may be set to a value of 100, such that need help interrupt 420 is only generated if CPU utilization exceeds 90% capacity for more than 100 consecutive cycles.

In another example, function component 404 combines N samples of utilization data 402 including CPU utilization values each clock cycle. In one example, to meet policies related to CPU load balancing for the compute node, can help threshold register 430 may be loaded with a value representative of total utilization below which the node has CPU resources available for load balancing, such as a value representative of 50% utilization of one or more CPUs. The policies for a compute node may be set such that it is preferable to avoid triggering can help interrupt 440 unless the CPU usage stays below 50% for a minimum number of clock cycles indicative of a slower workload period. In one example, to avoid triggering can help interrupt 440 for only small declines in CPU usage, can help count register 438 may be set to a value of 200, such that need help interrupt 420 is only generated if CPU utilization is less than 50% capacity for more than 200 consecutive cycles.

Figure 5:
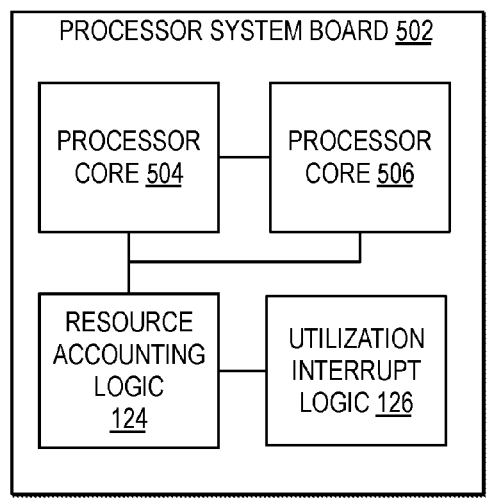
FIG. 5 is a block diagram illustrating one example of a processor system board including utilization interrupt logic on board with one or more processor cores.

FIG. 5 illustrates a block diagram of one example of a processor system board including utilization interrupt logic on board with one or more processor cores. As illustrated, the components, layers, and functions shown in FIG. 5 are intended to be illustrative only, and the invention is not limited thereto.

In the example, a processor system board 502 may be configured with one or more processor cores, such as a processor core 504 and a processor core 506, where each processor core may include a single processing unit or multiple processing units connected to one or more additional hardware elements. In one example, processor system board 502 is represented within hardware layer 120 of node 110.

In one example, processor system board 502 may include resource accounting logic 124 on board, where resource accounting logic 124 samples and gathers utilization statistics of one or more resources across sample windows. In one example, resource accounting logic 124 is configured to sample and gather utilization statistics for the use of one or more hardware resources of a node according to use of each of the one or more hardware resources by each of one or more virtual machines each defined by virtualized collections of the one or more hardware resources. In one example, resource accounting logic 124 samples and gathers utilization statistics for use of hardware resources 122 in hardware layer 120 by each of VM 132 and VM 134.

In the example, processor system board 502 may include utilization interrupt logic 126 on board or integrated into another processor core on board, where utilization interrupt logic 126 combines utilization statistics gathered by resource accounting logic 124, compares the combined utilization statistics against one or more thresholds, and triggers interrupts indicating a load balancing status of a node running on processor system board 502. In one example, where processor system board 502 is represented within hardware layer 120 of node 110, utilization interrupt logic 126 triggers interrupts indicating a load balancing status of node 110 as available to help with load balancing.

In the example, by positioning utilization interrupt logic 126 on board with resource accounting logic 124, utilization interrupt logic 126 may quickly read registers holding utilization statistics for VMs through paths hardwired between resource accounting logic 124 and utilization interrupt logic 126. In one example, when designing processor system board 502 for fabrication, utilization interrupt logic 126 may be positioned to minimize any latency on paths between resource accounting logic 124 and utilization interrupt logic 126. In another example, utilization interrupt logic 126 may be fabricated as a separate chip and installed on processor system board 502.

In another embodiment, either of processor core 504 and processor core 506 may integrate resource accounting logic 124 or utilization interrupt logic 126 into one or more of the processor cores. In addition, in another embodiment, one or more processor cores of processor system board 502 may each include a separate instance of resource accounting logic 124 and utilization interrupt logic 126, where the separate instance may be wired on processor system board 502 to communicate with one another. Further, in another embodiment, one or more of processor core 502 and processor core 504 may be on a processor board separate from a processor board embedded with utilization interrupt logic 126, wherein the processor boards are connected by one or more busses, network interfaces, or other types of connection interfaces. It will be apparent to one of ordinary skill in the art that the one or more processor cores of a node may be configured one or more processor system boards in multiple ways and that one or more processor system boards may be configured with other processor system boards in multiple ways. Resource accounting logic 124 and utilization interrupt logic 126 may be configured into processor cores, system boards, and other hardware layer elements in many different configurations.

Figure 6:
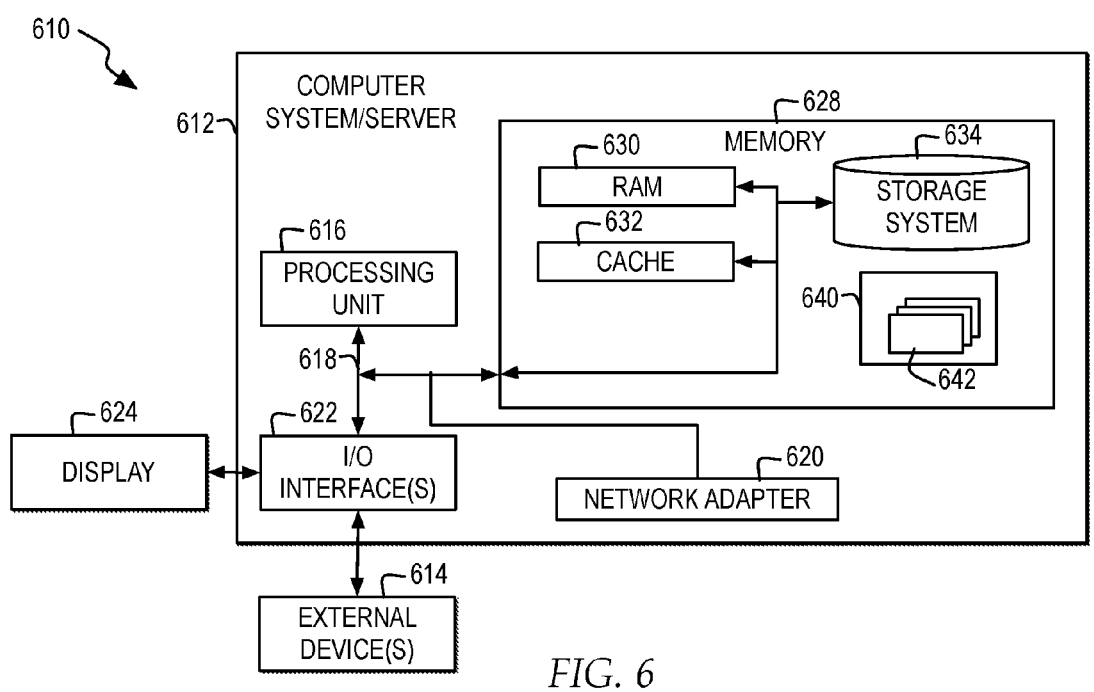
FIG. 6 is a block diagram illustrating one example of a schematic of one example of a cloud computing node.

Referring now to FIG. 6, a block diagram illustrates one example of a schematic of one example of a cloud computing node. Cloud computing node 610 is only one example of a cloud computing node and is not intended to suggest any limitation as to the scope of use or functionality of the invention described herein. Regardless, cloud computing node 610 is capable of being implemented and/or performing any of the functionality set forth herein.

It is understood that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile communication devices, laptops, and tablets).

Resource pooling: The provider's computing resources are pooled to serve multiple consumers using a multi-tenant model, with different physical and virtual resources dynamically assigned and reassigned according to demand. There is a sense of location independence in that the customer generally has no control or knowledge over the exact location of the provided resources but may be able to specify location at a higher level of abstraction (e.g., country, state, or datacenter). Examples of resources include storage, processing, applications, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying Cloud infrastructure including networks, servers, operating systems, or storage, but has control over the deployed applications and possibly applications hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid Cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability.

In cloud computing node 610, there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to one or more processors 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, a storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of the invention.

Program/utility 640 having a set (at least one) of program modules 642 may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to:

microcode, device drivers, redundant processing units, external disk drive arrays, RAID systems, tape drives, and data archival storage systems, etc.

Figure 7:
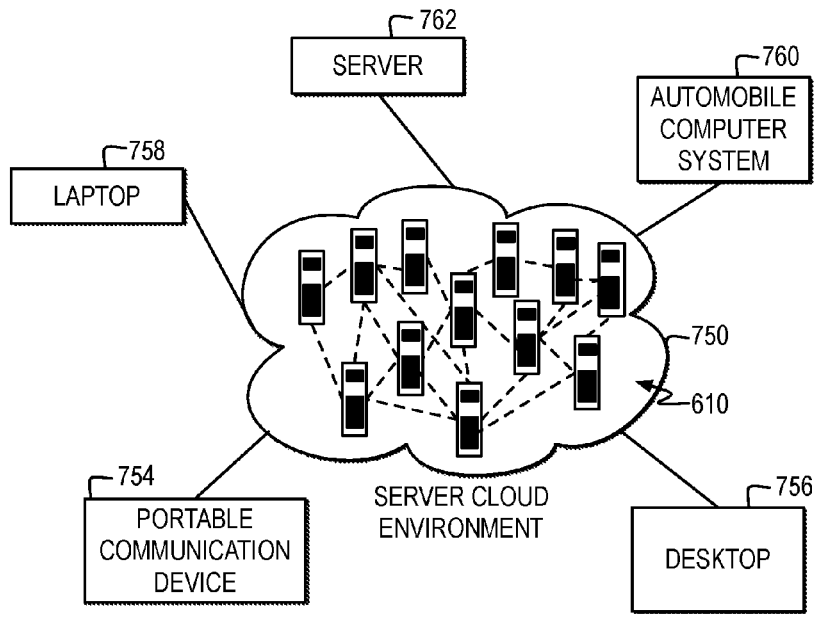
FIG. 7 is a block diagram illustrating a block diagram of one example of a cloud computing environment.

Referring now to FIG. 7, a block diagram illustrates one example of a cloud computing environment. As illustrates, a cloud computing environment 750 comprises one or more cloud computing nodes 610 with which computing devices such as, for example, portable communication device 754, desktop computer 756, laptop computer 758, server 762, and/or automobile computer system 760 communicate. Computing nodes 610 may communicate with one another within cloud computing environment 750 and they may be grouped (not shown) physically or virtually, in one or more networks, such as Private, Community, Public, or Hybrid clouds as described herein, or a combination thereof. This allows cloud computing environment 750 to offer infrastructure, platforms, and/or software as services for which a cloud consumer does not need to maintain resources on a local computing device. It is understood that the types of computing devices 754, 756, 758, 760, and 762 shown in FIG. 7 are intended to be illustrative only and that computing nodes 610 and cloud computing environment 750 can communicate with any type of computerized device over any type of network and/or network/addressable connection (e.g., using a web browser). In one example, one or more clients may interface with cloud computing environment 750 to schedule, deliver, and distribute workloads within cloud computing environment 750. Clients may schedule workloads that include service level agreements, where the service level agreements specify one or more performance parameters, policies, and other requirements of the workload.

Figure 8:
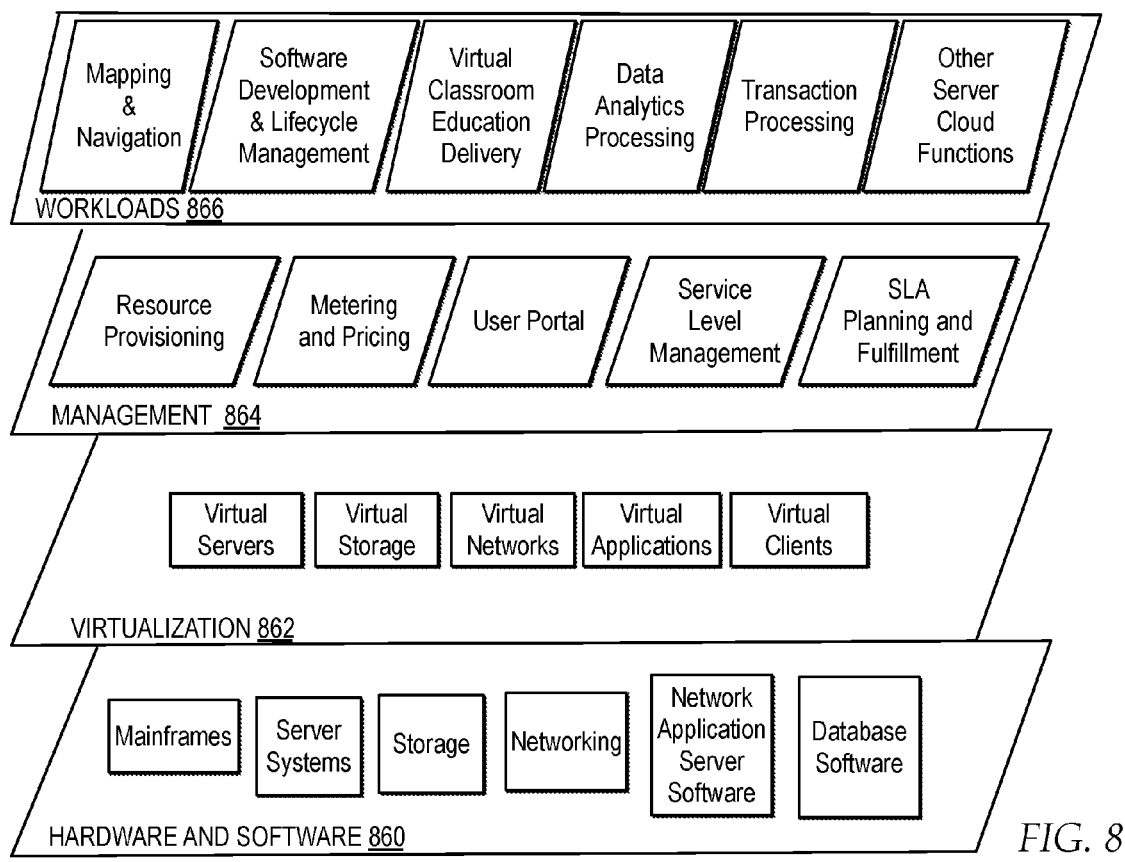
FIG. 8 is a block diagram illustrating a block diagram of a set of functional abstraction layers provided by a cloud computing environment.

Referring now to FIG. 8, a block diagram illustrates a set of functional abstraction layers provided by a cloud computing environment. As illustrated, the components, layers, and functions shown in FIG. 8 are intended to be illustrative only, and the invention is not limited thereto. As depicted, the following layers and corresponding functions are provided:

Hardware and software layer 860 includes hardware and software components. Examples of hardware components include mainframes, in one example, IBM® zSeries® systems; RISC (Reduced Instruction Set Computer) architecture based servers, in one example, IBM pSeries® systems; IBM xSeries® systems; IBM BladeCenter® systems; storage devices; networks, and networking components. Examples of software components include network application server software, in one example, IBM Web Sphere® application server software and database software, in one example, IBM DB2® database software. (IBM, zSeries, pSeries, xSeries, BladeCenter, WebSphere, and DB2 are registered trademarks of International Business Machines Corporation.)

Virtualization layer 862 provides an abstraction layer from which the following exemplary virtual entities may be provided: virtual servers; virtual storage; virtual networks, including virtual private networks; virtual applications; and virtual clients.

In one example, management layer 864 provides examples of functionality for which the cloud computing environment is utilized to handle one or more of the functions. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 866 provides examples of functionality for which the cloud computing environment is utilized for the workloads distributed by a workload distributor. Examples of workloads and functions which may be provided from this layer include: mapping and navigation; software development and lifecycle management; virtual classroom education delivery; data analytics processing; transaction processing; or any other function available within server cloud environment 750, which can work in conjunction with one or more of the functions of management layer 864. As mentioned above, all of the foregoing examples described with respect to FIG. 8 are illustrative only, and the invention is not limited to these examples.

Resource accounting logic 124, utilization interrupt logic 126, VMs, service VMs, and node management layers 102, and the functional elements thereof, generally implements the teachings of embodiments of the invention. To this extent, Resource accounting logic 124, utilization interrupt logic 126, VMs, service VMs, and node management layers 102 functionality can be implemented as hardware, software (e.g., program modules 642 of utility/program 640), or a combination thereof. Regardless, the resource accounting logic 124, utilization interrupt logic 126, VMs, service VMs, and node management layers 102 functions of embodiments of the invention will be further described in conjunction with FIGS. 9-13, as well as the illustrative examples previously described.

Figure 9:
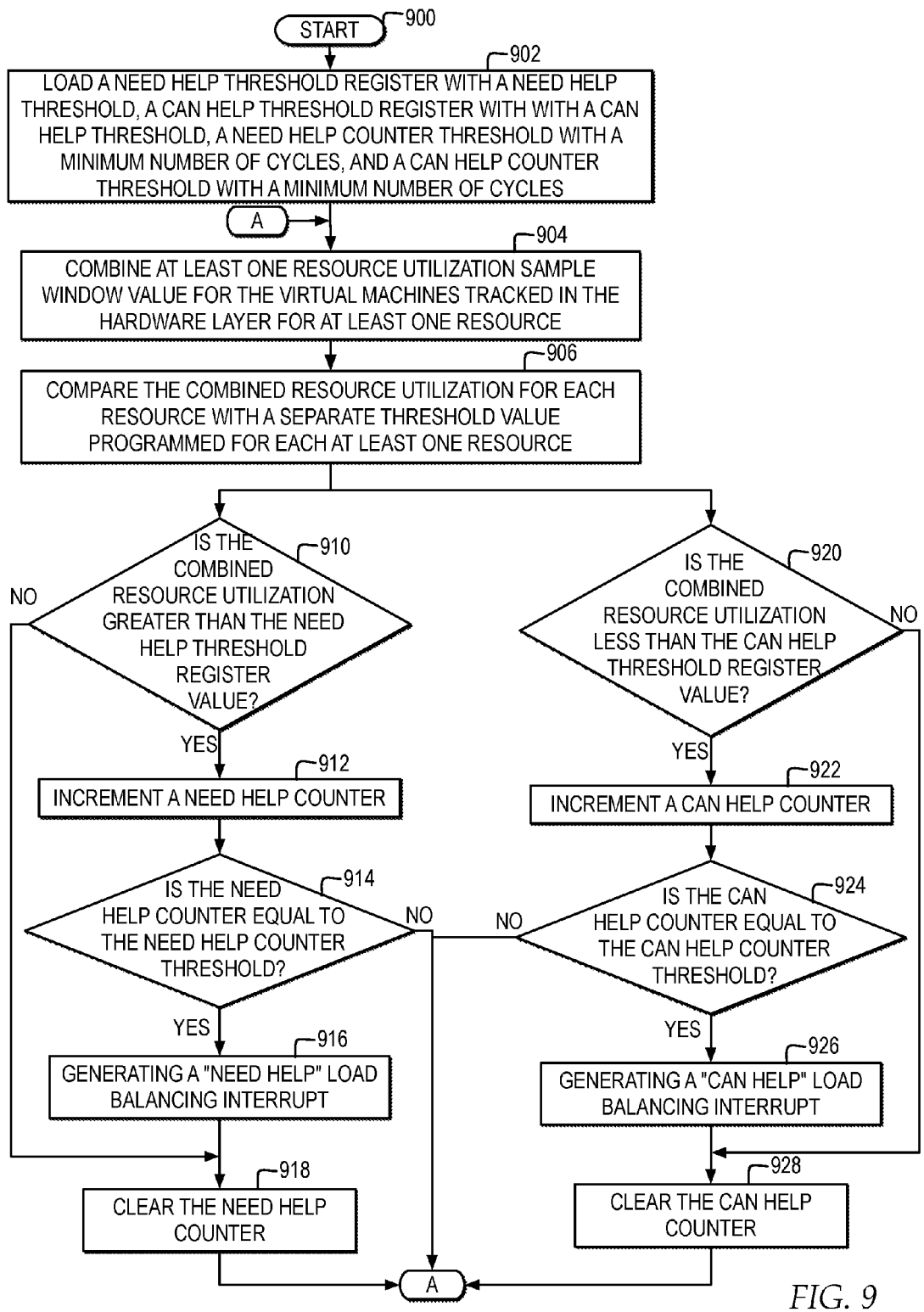
FIG. 9 is a high-level logic flowchart illustrating a process and program for generating load balancing interrupts at a hardware level in a computing node.

FIG. 9 illustrates a high-level logic flowchart of a process and program for generating load balancing interrupts at a hardware level in a computing node. In one embodiment, the process and program of FIG. 9 may be implemented through hardware logic on board with one or more processor cores or implemented within a processor core, where the processor cores are optimized for virtualization. In other embodiments, the process and program of FIG. 9 may be implemented through software elements or through a combination of hardware elements and software elements. In the example, the process and program starts at block 900 and thereafter proceeds to block 902. Block 902 illustrates loading a need help threshold register with a need help threshold, a can help threshold register with a can help threshold, a need help counter threshold with a minimum number of cycles, and a can help counter threshold with a minimum number of cycles. Block 904 illustrates combining at least one resource utilization sample windows values for one or more virtual machines tracked in the hardware layer for at least one resource. Next, block 906 illustrates comparing the combined resource utilization for each resource with a separate threshold value programmed for each at least one resource. Thereafter, the process and program may concurrently pass to block 910 and block 920.

Block 910 illustrates a determination whether the combined resource utilization is greater than the need help threshold value. At block 910, if the combined resource utilization is not greater than the need help threshold value, then the process may pass to block 918, or returns to block 904 as to the need help determination, depending on whether the need help counter is set to clear at each cycle or not. At block 910, if the combined resource utilization is greater than the need help threshold value, then the process passes to block 912. Block 912 illustrates incrementing a need help counter. Next, block 914 illustrates a determination whether the need help counter value is equal to the need help counter threshold value. At block 914, if the need help counter value is not equal to the need help counter threshold value, then the process returns to block 904 as to the need help determination. At block 914, if the need help counter value is equal to the need help counter threshold value, then the process passes to block 916. Block 916 illustrates generating a "need help" load balancing interrupt. Next, block 918 illustrates clearing the need help counter, and the process returns to block 904.

Block 920 illustrates a determination whether the combined resource utilization is less than the can help threshold value. At block 920, if the combined resource utilization is not less than the can help threshold value, then the process passes to block 928, or may return to block 904 as to the can help determination, depending on whether the can help counter is set to clear at each cycle or not. At block 920, if the combined resource utilization is less than the can help threshold value, then the process passes to block 922. Block 922 illustrates incrementing a can help counter. Next, block 924 illustrates a determination whether the can help counter value is equal to the can help counter threshold value. At block 924, if the can help counter value is not equal to the can help counter threshold value, then the process returns to block 904 as to the can help determination. At block 924, if the can help counter value is equal to the need help counter threshold value, then the process passes to block 926. Block 926 illustrates generating a "can help" load balancing interrupt. Next, block 928 illustrates clearing the can help counter, and the process returns to block 904.

Figures 10, 11:
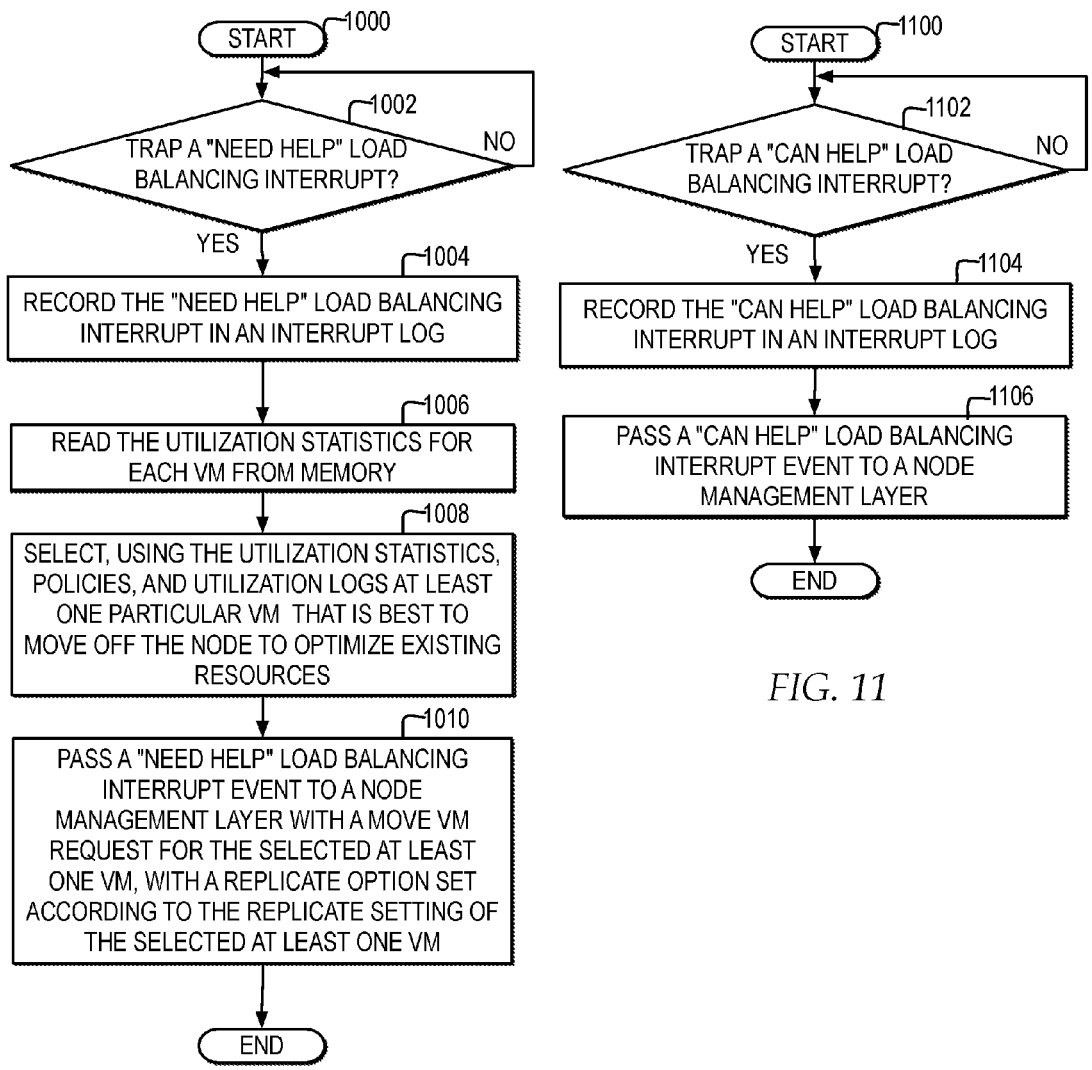
FIG. 10 is a high-level logic flowchart illustrating a process and program for a local software service of a computing node to handle load balancing interrupts generated at a hardware level in a computing node requesting help with load balancing.
FIG. 11 is a high-level logic flowchart illustrating a process and program for a local software service of a computing node to handle load balancing interrupts generated at a hardware level in a computing node indicating the computing node is available for load balancing.

FIG. 10 illustrates a high-level logic flowchart of a process and program for a local software service of a computing node to handle load balancing interrupts generated at a hardware level in a computing node requesting help with load balancing. In the example, the process starts at block 1000 and thereafter proceeds to block 1002. Block 1002 illustrates a determination whether a software service traps a "need help" load balancing interrupt generated by a hardware layer of a computing node. At block 1002, if the software service traps a "need help" load balancing interrupt, then the process passes to block 1004. Block 1004 illustrates recording the "need help" load balancing interrupt in an interrupt log. Next, block 1006 depicts reading the utilization statistics for each virtual machine on the computing node from memory. Thereafter, block 1008 illustrates selecting, based on the utilization statistics, policies, and utilization logs, at least one particular VM that is best to move off the node to optimize existing resources. Next, block 1010 illustrates passing a "need help" load balancing interrupt event to a node management layer with a move VM request for the selected at least one VM, with a replicate option set according to the replicate setting of the selected at least one VM, and the process ends.

FIG. 11 illustrates a high-level logic flowchart of a process and program for a local software service of a computing node to handle load balancing interrupts generated at a hardware level in a computing node indicating the computing node is available for load balancing. In the example, the process and program starts at block 1100 and thereafter proceeds to block 1102. Block 1102 illustrates a determination whether a software service traps a "can help" load balancing interrupt. At block 1102, if the software layer traps a "can help" load balancing interrupt, then the process passes to block 1104. Block 1104 illustrates recording the "can help" load balancing interrupt in an interrupt log. Next, block 1106 illustrates passing a "can help" load balancing interrupt event to a node management layer, and the process ends.

Figure 12:
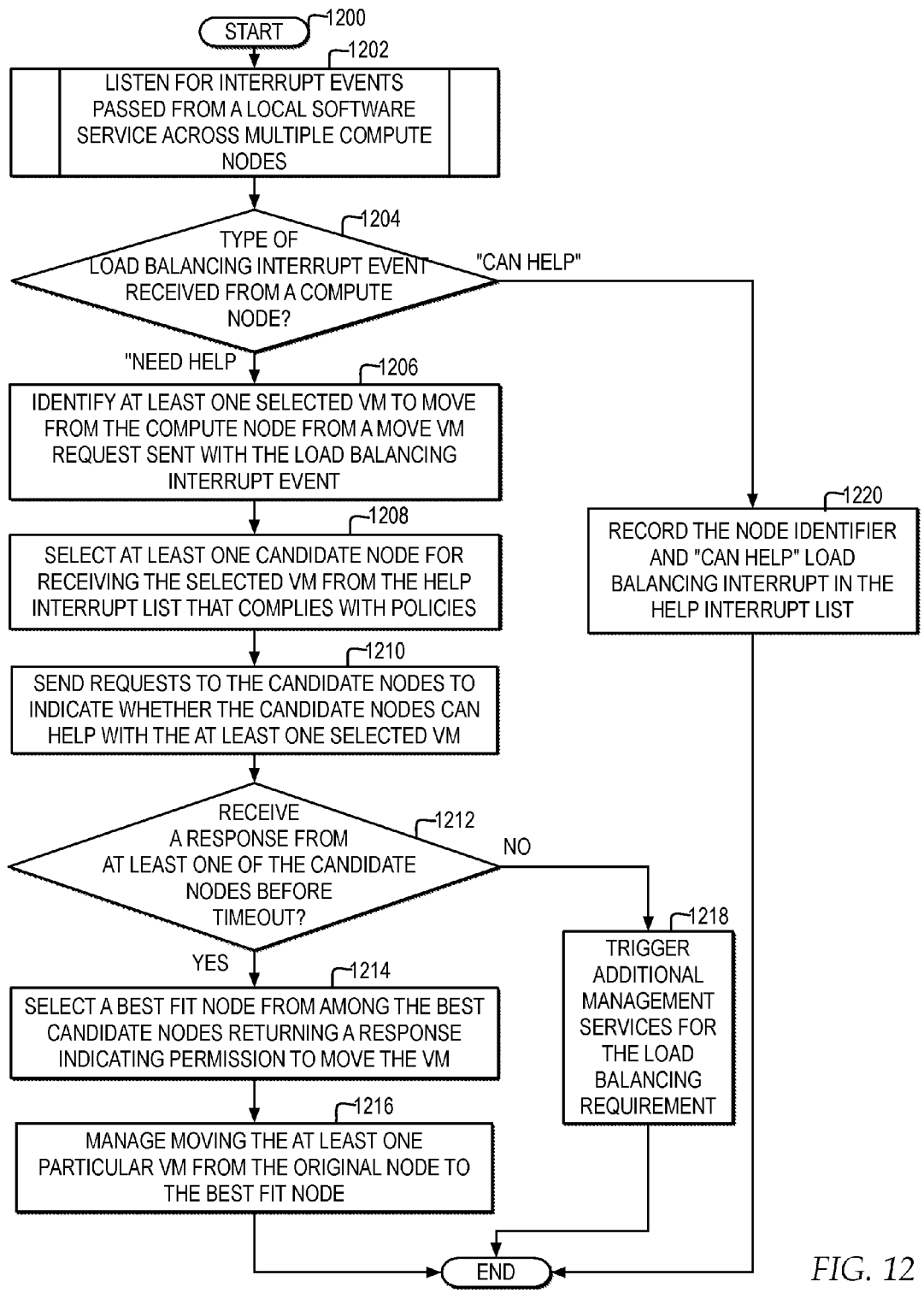
FIG. 12 is a high level logic flowchart illustrating a process and program for a node management service to handle interrupts from a computing node local software service to management load balancing in a computing environment.

FIG. 12 illustrates a high level logic flowchart of a process and program for a node management service to handle interrupts from a computing node local software service to management load balancing in a computing environment. In the example, the process starts at block 1200 and thereafter proceeds to block 1202. Block 1202 illustrates listening for interrupt events passed from one of a local software services of one of multiple computing nodes. Next, block 1204 illustrates a determination whether, when the node management service receives a load balancing interrupt event for a computing node from a local software service, whether the load balancing interrupt event is a "need help" load balancing interrupt event or a "can help" load balancing interrupt event.

At block 1204, if a node management service receives a "need help" load balancing interrupt event from a computing node, the process passes to block 1206. Block 1206 illustrates identifying at least one selected VM to move from the computing node requesting load balancing from a move VM request sent with the load balancing interrupt event. Next, block 1208 illustrates selecting at least one candidate node for receiving the VM from the nodes identified in the help interrupt list as available, where the at least one candidate node selection also complies with policies required for load balancing the VM, the computing nodes, and other entities. Next, block 1210 illustrates requesting permission from the candidate nodes to move the selected at least one VM. Thereafter, block 1212 illustrates a determination whether the node management service receives a response from at least one of the candidate nodes before the request timeout. At block 1212 if the node management service does not receive any response from at least one of the candidate nodes before the request timeout, then the process passes to block 1218. Block 1218 illustrates triggering additional management services for the load balancing requirement, and the process ends. Returning to block 1212, if the node management service does receive a response from at least one of the candidate nodes before timeout, then the process passes to block 1214. Block 1214 illustrates selecting a particular node from among the best candidate nodes returning a response indicating permission to move the VM as the best fit node. Next, block 1216 illustrates managing moving the at least one selected VM from the original node to the best fit node, and the process ends.

At block 1204, if a node management service receives a "can help" load balancing interrupt event from a computing node, the process passes to block 1220. Block 1220 illustrates recording the node identifier and "can help" load balancing interrupt in the help interrupt list, and the process ends.

Figure 13:
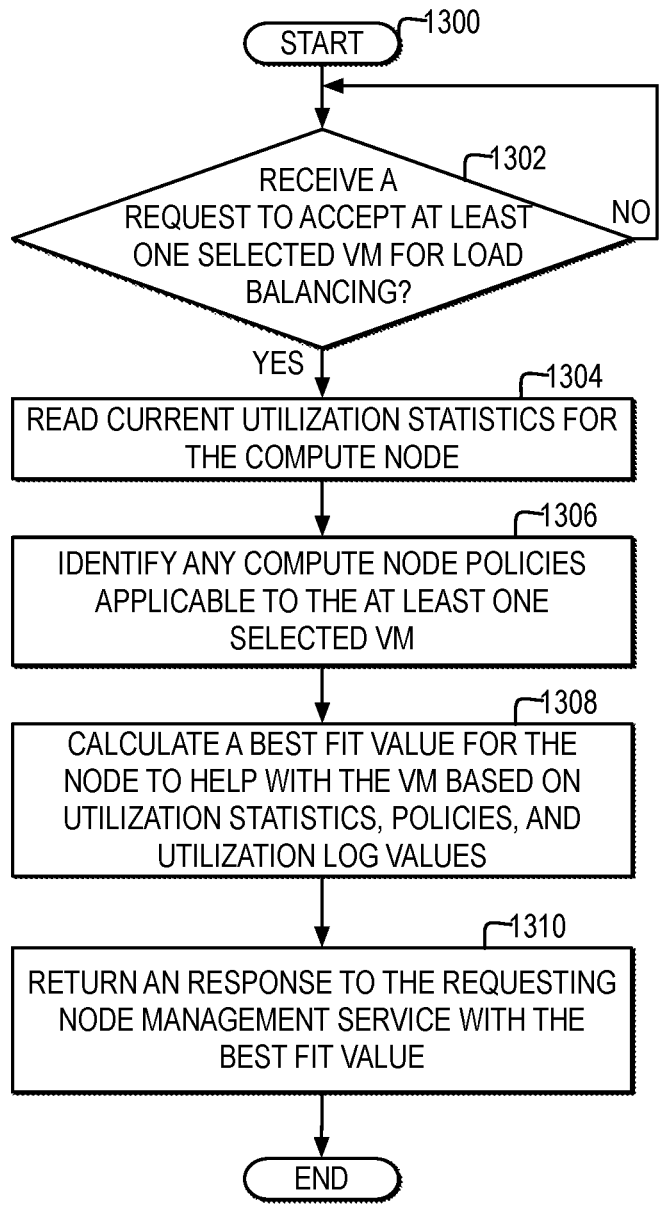
FIG. 13 is a high level logic flowchart illustrating a process and program for handling requests to accept a virtual machine for load balancing.

FIG. 13 illustrates a high level logic flowchart of a process and program for handling requests to accept a virtual machine for load balancing. In the example, the process and program starts at block 1300 and thereafter proceeds to block 1302. Block 1302 illustrates a determination whether a request to accept at least one selected VM for load balancing is received by a local software layer of a computing node. Next, block 1304 illustrates reading the current utilization statistics for the computing node. Thereafter, block 1306 illustrates identifying any computing node policies applicable to the at least one selected VM. Next, block 1308 illustrates calculating a best fit value for the node to help with the VM based on utilization statistics, policies, and utilization log values. Block 1310 illustrates returning a response to the requesting node management service with the best fit value, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computing node comprising:
    at least one hardware layer comprising a plurality of hardware resources, wherein the plurality of hardware resources comprise at least one processor and at least one memory;
    at least one virtualization layer operative on the at least one processor communicatively connected to the at least one memory to manage at one virtual machine defined by at least one resource from among the plurality of hardware resources;
    load balancing interrupt logic configured in the hardware layer of the computing node and operative to compare at least one resource utilization level of the plurality of hardware resources by the at least one virtual machine with at least one threshold;
    the load balancing interrupt logic operative to generate at least one load balancing interrupt indicating at least one load balancing status of the computing node based on the comparison of the at least one resource utilization level with the at least one threshold, by:
        the load balancing interrupt logic, responsive to the at least one resource utilization level being equal to or greater than the at least one threshold, operative to generate a first load balancing interrupt indicating the computing node requires load balancing; and
        the load balancing interrupt logic, responsive to the at least one resource utilization level being less than the at least one threshold, operative to generate a second load balancing interrupt indicating the computing node is available for load balancing;
    the computing node comprising a management partition in the virtualization layer operative to trap the second load balancing interrupt output from the hardware layer; and
    the management partition, responsive to trapping the second load balancing interrupt, operative to pass the second load balancing interrupt, via a network, to a node management layer, wherein the node management layer identifies the computing node as available to handle workloads and responsive to another computing node requiring load balancing for another virtual machine, queries the computing node to determine if the computing node is available to receive the another virtual machine.

2. The computing node according to claim 1, wherein:
    the computing node further comprises resource accounting logic configured in the hardware layer and operative to sample a separate resource utilization level of a particular type of resource from among the plurality of hardware resources in the hardware layer for each separate at least one virtual machine; and
    the load balancing interrupt logic operative to sum the separate resource utilization level of the particular type of resource for each separate at least one virtual machine into the at least one resource utilization level representing a total utilization of the particular type resource within the computing node.

3. The computing node according to claim 1, wherein the computing node is provided as a virtualized computing node in a cloud server environment.

4. A processor system, comprising:
    at least one processor connected to at least one memory in a particular node from among a plurality of nodes;
    a comparator operative to compare at least one resource utilization level of the at least one processor by at least one virtual machine running on the at least one processor in the particular node with at least one threshold;
    the comparator operative to generate at least one load balancing interrupt indicating at least one load balancing status of the at least one processor for the at least one virtual machine based on the comparison of the at least one resource utilization level with the at least one threshold by:

responsive to the at least one resource utilization level equal to or greater than the at least one threshold, generating a first load balancing interrupt indicating the at least one virtual machine requires load balancing; and responsive to the at least one resource utilization level less than the at least one threshold, generating a second load balancing interrupt indicating the at least one virtual machine is available for load balancing;

a management partition in a software layer of the particular node operative to trap the second load balancing interrupt output from comparator in a hardware layer; and the management partition, responsive to trapping the second load balancing interrupt, operative to pass the second load balancing interrupt, via a network, to a node management layer, wherein the node management layer identifies the particular computing node as available to handle workloads and responsive to another computing node of the plurality of nodes requiring load balancing for another virtual machine, queries the particular computing node to determine if the particular computing node is available to receive the another virtual machine.

5. The processor system according to claim 4, wherein the computing node is operative as a virtualized computing node in a cloud server environment.

6. The processor system according to claim 4, wherein the at least one processor and the comparator are embedded in a same processor board.

7. The processor system according to claim 4, further comprising:
a function component for averaging a plurality of sampled utilization data values of the at least one processor by the at least one virtual machine into the at least one resource utilization level.

8. The processor system according to claim 4, wherein the comparator, responsive to the at least one resource utilization level being greater than at least one threshold, operative to generate a load balancing interrupt indicating the at least one processor requires load balancing further comprises:
a counter operative to increment a counter value responsive to the least one resource utilization level being greater than the at least one threshold;
a second comparator operative to compare the counter value with a counter threshold value; and
the second comparator, responsive to the counter value matching the counter threshold value, operative to generate the first load balancing interrupt indicating the at least one processor core requires load balancing.

9. The processor system according to claim 4, further comprising:
resource accounting logic in the hardware layer for sampling the at least one resource utilization level of the at least one processor for each at least one virtual machine on the particular node for each cycle.

10. A method for reporting load balancing needs comprising:
comparing, at hardware level in a computing node, at least one resource utilization level of at least hardware resource by at least one virtual machine running in a software level on the at least one hardware resource with at least one threshold;
responsive to the at least one resource utilization level being equal to or greater than the at least one threshold, generating, at the hardware level, a first load balancing interrupt indicating the at least one virtual machine requires load balancing for the computing node;
responsive to the at least one resource utilization level being less than the at least one threshold, generating, at the hardware level, a second load balancing interrupt indicating the computing node is available for load balancing;
trapping, by the software layer of the computing node, the second load balancing interrupt; and
responsive to trapping the second load balancing interrupt, passing, by the software layer of the computing node, the second load balancing interrupt, via a network, to a node management layer, wherein the node management layer identifies the computing node as available to handle workloads and responsive to another computing node requiring load balancing for another virtual machine, queries the computing node to determine if the computing node is available to receive the another virtual machine.

11. The method according to claim 10, further comprising:
trapping, by the software layer of the computing node, the first load balancing interrupt;
in response to trapping the first load balancing interrupt, accessing, by the software layer of the computing node, at least one sampled utilization value of the at least one hardware resource specified according to each at least one virtual machine from the hardware layer;
selecting, at the software layer of the computing node, a particular virtual machine from among the at least one virtual machine based on the at least one sampled utilization value of the at least one hardware resource specified according to each at least one virtual machine from the hardware layer; and
passing a request, from the software layer, to the node management layer to move the particular virtual machine to at least one other computing node for load balancing.

12. The method according to claim 11, further comprising:
averaging, at the hardware level, the at least one sampled utilization value of the at least one hardware resource specified according to each at least one virtual machine from the hardware layer into the at least one utilization level of at least hardware resource.

\* \* \* \* \*